United States Patent
Alam et al.

(10) Patent No.: US 9,613,531 B2
(45) Date of Patent: Apr. 4, 2017

(54) METHODS, DEVICES, AND COMPUTER READABLE STORAGE DEVICE FOR PROVIDING ALERTS

(71) Applicant: AT&T Mobility II LLC, Atlanta, GA (US)

(72) Inventors: Iftekhar Alam, Atlanta, GA (US); Ming-Ju Ho, Alpharetta, GA (US); Patrick Mascarenhas, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 752 days.

(21) Appl. No.: 13/905,386

(22) Filed: May 30, 2013

(65) Prior Publication Data

US 2014/0354449 A1    Dec. 4, 2014

(51) Int. Cl.
| | |
|---|---|
| *G08G 1/0965* | (2006.01) |
| *G08G 1/16* | (2006.01) |
| *H04W 4/02* | (2009.01) |
| *H04W 4/04* | (2009.01) |

(52) U.S. Cl.
CPC .......... *G08G 1/0965* (2013.01); *G08G 1/164* (2013.01); *H04W 4/023* (2013.01); *H04W 4/028* (2013.01); *H04W 4/046* (2013.01)

(58) Field of Classification Search
CPC combination set(s) only.
See application file for complete search history.

(56) References Cited

U.S. PATENT DOCUMENTS

| | | | |
|---|---|---|---|
| 4,238,778 A | 12/1980 | Ohsumi | |
| 4,443,783 A | 4/1984 | Mitchell | |
| 5,014,052 A | 5/1991 | Obeck | |
| 6,417,782 B1 | 7/2002 | Darnall | |
| 6,529,831 B1 * | 3/2003 | Smith | G08G 1/162 340/903 |
| 6,958,707 B1 * | 10/2005 | Siegel | G08G 1/087 340/435 |
| 7,271,736 B2 | 9/2007 | Siegel et al. | |
| 7,663,504 B2 | 2/2010 | Votaw et al. | |
| 8,301,463 B2 * | 10/2012 | Lui | H04M 1/72541 705/2 |
| 9,066,210 B2 * | 6/2015 | Kalita | H04W 4/04 |
| 2007/0159354 A1 * | 7/2007 | Rosenberg | G08G 1/0965 340/902 |

(Continued)

OTHER PUBLICATIONS

Jain et al. "Emergency Vehicle Detection System", Project Proposal, Univ. of Illinois, pp. 1-7 (Sep. 15, 2010).

(Continued)

*Primary Examiner* — Brian Zimmerman
*Assistant Examiner* — Cal Eustaquio
(74) *Attorney, Agent, or Firm* — Hartman & Citrin LLC

(57) ABSTRACT

In determining whether to provide an alert associated with a mobile element to a mobile communication device, speeds and directions of travel of the mobile element and the mobile communication device are determined. A relative location of the mobile communication device is calculated with respect to the mobile element. Based on the relative location of the mobile communication device with respect to the mobile element, a determination is made whether the alert should be provided.

20 Claims, 6 Drawing Sheets

(56) References Cited

U.S. PATENT DOCUMENTS

2012/0064921 A1* 3/2012 Hernoud ............... G01C 21/20
                                                    455/456.6
2012/0136559 A1   5/2012 Rothschild

OTHER PUBLICATIONS

EVA—Emergency Vehicle Alert System, www.evallc.com, 2pp (Printed May 29, 2013).
PBS Stations Named for Mobile Emergency Alert System Pilot Project Designed to Deliver Video, Maps, Photos, Audio, Text to Mobile Devices, http://www.pbs.org/about/news/archive/2011/pbs-mobile-eas-pilot/, 2pp (Nov. 30, 2011).
GPS Alerts Drivers to Emergency Vehicles, http://www.thedenverchannel.com/news/gps-alerts-drivers-to-emergency-vehicles (Jul. 1, 2010).
SpeedView: GPS Speedometer—Android Apps on Google Play, https://play.google.com/store/apps, 2pp (Printed May 30, 2013).

* cited by examiner

METHODS, DEVICES, AND COMPUTER READABLE STORAGE DEVICE FOR PROVIDING ALERTS

TECHNICAL FIELD

The present disclosure relates generally to telecommunications, and, more particularly, to providing alerts.

BACKGROUND

Drivers of vehicles are often unaware of approaching emergencies, such as an emergency vehicle. As they drive, drivers may be listening to loud music, talking on a phone or to a passenger, focused on the road ahead, etc. Also, modern vehicles are insulated against outside noise, and in the future, vehicles will likely be better insulated against outside noise. A driver is often unaware of an approaching emergency vehicle until the vehicle is very close or is actually trying to pass the driver's vehicle. The driver's delay in acting to move over to allow the emergency vehicle to pass or a startled reaction of the driver in noticing the emergency vehicle may result in an accident.

In busy noisy cities, in particular, drivers may be unaware of approaching emergency vehicles due to the additional concentration required for driving. In these areas, drivers often unintentionally block emergency vehicles, leading to delays in the response time of the emergency vehicles.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a method is provided for providing alerts. First information indicating a location of a mobile element is received, including changes to the location of the mobile element over a predetermined time period. Second information indicating a location of a mobile communication device that is located within a predefined vicinity of the mobile element is also received. The second information includes changes to the location of the mobile communication device over the predetermined time period. A speed and a direction of travel of the mobile element are determined, and a speed and a direction of travel of the mobile communication device are also determined based on the received second information. A relative location of the mobile communication device is calculated with respect to the mobile element based on the received first information, the received second information, the speed and the direction of the travel of the mobile element, and the speed and the direction of travel of the mobile communication device. Based on the relative location of the mobile communication device with respect to the mobile element, a determination is made whether the alert associated with the mobile element should be provided to the mobile communication device.

According to another embodiment, a device is provided for providing alerts. The device includes a processor and a memory. The memory has stored thereon instruction which, when executed by the processor cause the processor to perform operations. The operations include receiving first information indicating a location of a mobile element and receiving second information indicating a location of a mobile communication device that is located within a predefined vicinity of the mobile element. The first information includes changes to the location of the mobile element over a predetermined time period, and the second information includes changes to the location of the mobile communication device over the predetermined time period. The operations further include determining a speed and a direction of travel of the mobile element and determining a speed and a direction of travel of the mobile communication device based on the received second information. The operations further include calculating a relative location of the mobile communication device with respect to the mobile element based on the received first information, the received second information, the speed and the direction of the travel of the mobile element, and the speed and the direction of travel of the mobile communication device, and determining, based on the relative location of the mobile communication device with respect to the mobile element, whether the alert associated with the mobile element should be provided to the mobile communication device.

According to another embodiment, a non-transitory computer readable storage device has instructions stored thereon which, when executed by processor, cause the processor to perform operations. The operations include receiving first information indicating a location of a mobile element and receiving second information indicating a location of a mobile communication device that is located within a predefined vicinity of the mobile element. The first information includes changes to the location of the mobile element over a predetermined time period, and the second information includes changes to the location of the mobile communication device over the predetermined time period. The operations further include determining a speed and a direction of travel of the mobile element and determining a speed and a direction of travel of the mobile communication device based on the received second information. The operations further include calculating a relative location of the mobile communication device with respect to the mobile element based on the received first information, the received second information, the speed and the direction of the travel of the mobile element, and the speed and the direction of travel of the mobile communication device, and determining, based on the relative location of the mobile communication device with respect to the mobile element, whether the alert associated with the mobile element should be provided to the mobile communication device.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to illustrative embodiments, mobile communication devices equipped with location-tracking capabilities may be used to dynamically alert users of the mobile communication devices of emergency conditions, e.g., approaching emergency vehicles, weather events, etc. Using the mobile communication device for providing alerts is particularly useful for drivers of vehicles, as the location-tracking capabilities of the mobile communication device may be leveraged to provide alerts, without requiring installation of expensive emergency avoidance systems within the vehicles. Although the description that follows discusses an emergency vehicle alert use case in detail, the disclosure is not limited to this case. For example, the disclosure may also be applicable to other emergencies, e.g., weather events, such that warnings can be targeted to users of mobile communication devices who are in the path of danger.

According to an illustrative embodiment, users of mobile communication devices may be provided with an alert that emergency vehicles are approaching towards his/her area based not only on the geographical location of the mobile communication device but also based on the speed and direction of travel of the mobile communication device, as well as the location, speed, and direction of travel of the emergency vehicle. Drivers having mobile communication devices with them may be provided with alerts about approaching emergency vehicles so that they can take appropriate action and stay clear of the emergency vehicles. This achieves two purposes; it keeps users of the mobile communication devices safe and allows emergency vehicles to have the right of way.

Figure 1A:
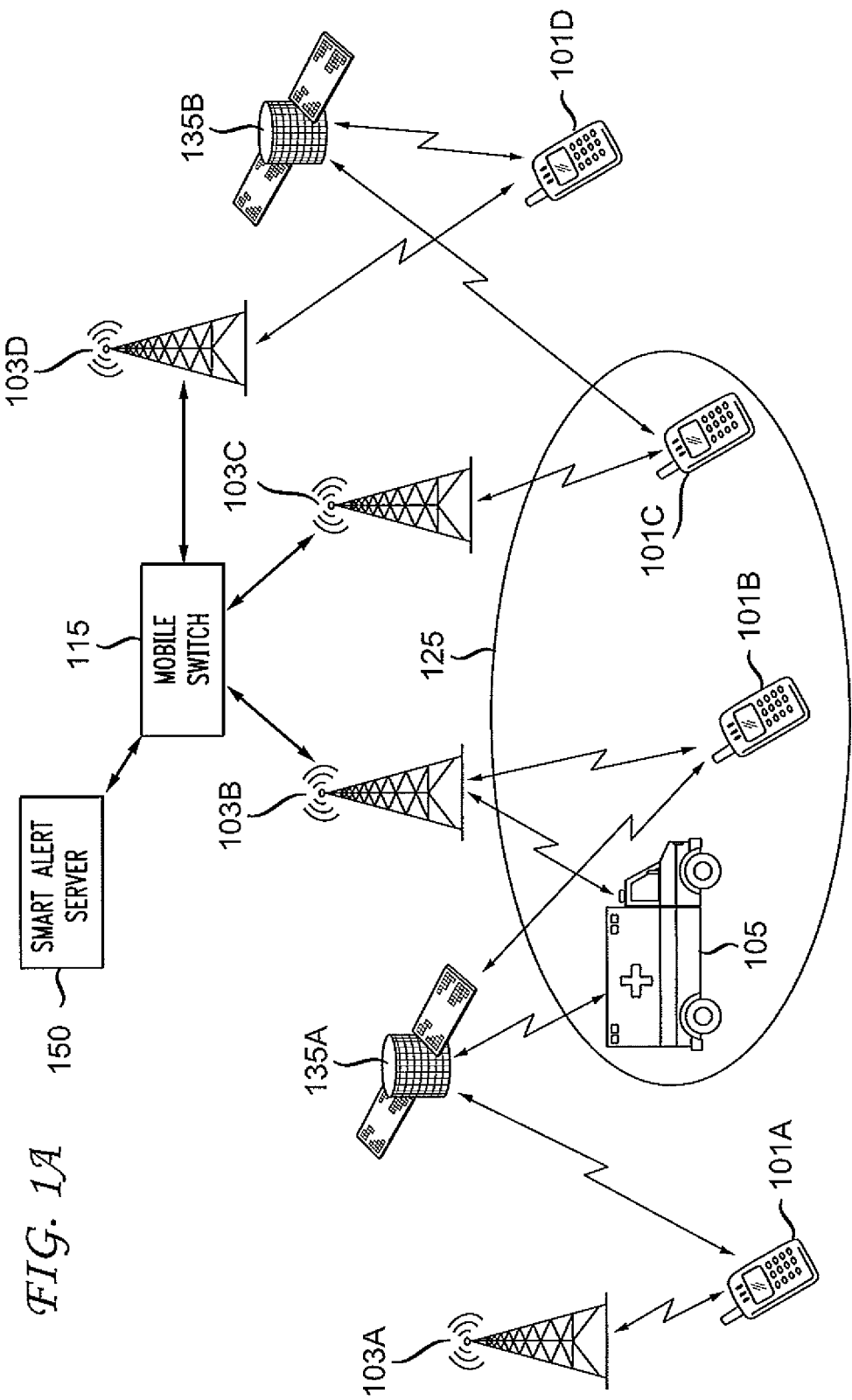
FIG. 1A illustrates an environment in which alerts may be provided according to an illustrative embodiment.

FIG. 1A illustrates an environment in which a system for providing alerts may be implemented according to illustrative embodiments. Referring to FIG. 1A, a mobile element 105, e.g., an emergency vehicle, is in communication with a smart alert server 150 via a base station 103B and a mobile switch 115. According to one embodiment, the mobile element 105 may be an emergency vehicle. The emergency vehicle may include a network device implemented as a mobile communication device or any other device that has location tracking capabilities (such as a global positioning system (GPS), triangulation, etc.). This device may be referred to as a source device.

Although the source device is understood with reference to FIG. 1A as being included within the mobile element 105, it should be appreciated that the source device may be outside of the mobile element 105. For example, if the mobile element 105 is a moving environmental element, e.g., a storm, the location of the mobile element 105 may be tracked, e.g., by a Doppler radar device or other type of device within a weather station not included within the mobile element 105. In this scenario, the source device may be implemented with a device within the weather station having location tracking capabilities and transmission capabilities.

Referring again to FIG. 1A, mobile communication devices 101A, 101B, 101C and 101D are equipped with location-tracking capabilities so that their locations may be tracked. The speed and direction of travel of the mobile communication devices 101A, 101B, 101C and 101D may also be tracked or calculated, as described in more detail below. In FIG. 1A, the mobile communication devices 101A, 101B, 101C and 101D are in communication with GPS satellites 135A and 135B, respectively, such that their locations can be tracked. It should be appreciated that other types of location tracking, e.g., triangulation, may be used to track the locations of the mobile communication devices 101A, 101B, 101C and 101D. The mobile communication devices 101A, 101B, 101C, and 101D may be referred to as destination devices. These devices may be implemented with a mobile communication device such as that depicted in FIG. 2.

Referring to FIG. 1A, a source device, which may be included within the mobile element 105, is in communication with a GPS satellite 135A for location tracking. It should be appreciated that other forms of location tracking, e.g., triangulation, may be used to track the location of the mobile element 105. The speed and direction of travel of the mobile element 105 may also be tracked or calculated, as described in further detail below.

The mobile communication devices 101A, 101B, 101C and 101D that may be tracked may be those of a user traveling in a vehicle or outside a vehicle. In the case of a weather event, the mobile communication device 101A, 101B, 101C and 101D may be that of a user who is stationary but may still need to be alerted.

According to one embodiment, in an emergency situation involving an emergency vehicle as the mobile element 105, an operator of the emergency vehicle switches on the emergency lights and sirens. Switching on of the lights may, in turn, cause a signal to be transmitted to the source device within the emergency vehicle to initiate tracking of the location of the emergency vehicle. According to one embodiment, the location of the mobile element 105 is determined by GPS. In the case of poor GPS cover, the location of the mobile element 105 may be determined by network location elements, e.g., triangulation of base stations serving the area in which the mobile element 105 is location. The device location may follow the E911 network location.

Information indicating the location of the mobile element 105 is transmitted to a mobile switch 115 (which may be implemented as a device 114 and/or a device 138 as described in detail below with reference to FIG. 1B). The information indicating the location of the mobile element 105 is, in turn, transmitted by the mobile switch 115 to a smart alert server 150. The smart alert server 150 determines the speed and direction of travel of the mobile element 105 based on the received information indicating the location of the mobile element 105, as the information changes over time. As an alternative, if the source device within the mobile element 105 is equipped with sufficient tracking capabilities, the speed and direction of travel of the mobile element 105 may be provided to the smart alert server 150. In the case of the mobile element 105 being an environmental event, such as a storm, the source device may be a stand-alone device with location/tracking capabilities which track the location, speed, and direction of travel of the mobile element 105 and transmit this information to the smart alert server 150 via the mobile switch 115 or via any other suitable radio transmission.

According to one embodiment, receipt of the location information from the source device may serve as an indication to the smart alert server 150 that there is an emergency, such that destination devices within a vicinity of the mobile element 105 need to be tracked and alerted, as appropriate. Thus, responsive to receiving the location information from the source device, the smart alerts server 150 requests the mobile switch 115 to provide locations of all the destination devices within the vicinity of the mobile element 105. In the case of the mobile element 105 being an emergency vehicle, the destination devices within the vicinity of the mobile element 105 are those mobile communication devices 101A, 101B, 101C and 101D that are connected to, camped on or registered to the source base station to which the source device is registered and neighboring base stations. The neighboring base stations may be considered those base stations that serve areas that are within a predefined distance of the area served by the source base station. Thus, the vicinity may be predefined such that, for example, it includes the area served by the source base station and areas served by neighboring base stations.

Referring to FIG. 1A, for example, the mobile element 105 is in communication with a base station 103B, which is considered to be the source base station. Mobile communication device 101B is also in communication with the base station 103B and thus is considered to be in the vicinity of the mobile element 105. Mobile communication device 101A is in communication with a base station 103A, and the coverage area of the base station 103A is not close enough to the area covered by the base station 103B to be considered a neighboring base station. As shown in FIG. 1A, the base station 103A is not even in communication with the mobile switch 115. Thus, mobile communication device 101A is not considered to be within the vicinity of the mobile element 105. Mobile communication devices 101C and 101D are in communication with the base stations 103C and 103D, respectively. The areas served by the base stations 103C and 103D are close enough to the area served by the base station 103B to be considered neighboring base stations. Thus, mobile communication devices 103C and 103D are considered to be within the vicinity of the mobile element 105. The base stations 103A, 103B, 103C and 103D may be implemented with base stations, such as the base stations 102 and 132 shown in FIG. 1B.

In the case of the mobile element being an environmental event, such as a storm, the vicinity may be predefined such that it includes a predefined area surrounding a location of the mobile element.

According to an illustrative embodiment, the smart alert server 150 calculates the speed and direction of travel of the mobile communication devices 101B, 101C, and 101D that are within the vicinity of the mobile element 105, based on the reported locations of the mobile communication devices 101B, 101C, and 101D. As an alternative, as indicated above, for those mobile communication devices having more advanced tracking capabilities, the speed and direction of travel of the mobile communication devices may be calculated by the mobile communication devices and transmitted to the smart alert server 150, along with the location information, via the mobile switch 115.

The smart alert server 150 maps the locations of the mobile communication devices 101A, 101B, 101C and 101D within the vicinity of the mobile element 105 and calculates each mobile communication device's 101A, 101B, 101C and 101D location relative to the location of the mobile element 105. As the locations of the mobile element 105 changes over time, the smart alert server 150 may continually request the mobile switch 115 to provide the locations of the mobile communication devices 101A, 101B, 101C and 101D within the vicinity of the mobile element 105. The smart alert server 150 calculates the relative locations of the mobile communication devices 101A, 101B, 101C and 101D with respect to the mobile element 105 based on the locations, speed and direction of travel of the mobile element 105 and the mobile communication devices 101A, 101B, 101C and 101D. According to illustrative embodiments, the mobile communication devices 101A, 101B, 101C and 101D that are within the vicinity of the mobile element 105 may be provided with alerts based on the relative locations of the mobile communication devices 101A, 101B, 101C and 101D with respect to the location of the mobile element 105 and based on specified parameters. The parameter settings dictate which mobile communication devices 101A, 101B, 101C and 101D within the vicinity of the mobile element 105 should be alerted. Different parameters may be specified for different scenarios. Based on the parameter settings, a subset of the mobile communication devices 101A, 101B, 101C and 101D within the vicinity of the mobile element 105 may be alerted. The parameter settings may be stored in advance in the smart alert server 150 and/or may be provided by the source device.

An example of a parameter setting may be an area within a predefined proximity to the mobile element 105. For example, in the scenario in which the mobile element 105 is an emergency vehicle, a parameter setting may indicate that only those mobile communication devices 101A, 101B, 101C and 101D that are within 300 feet of the emergency vehicle should be alerted.

The predefined proximity is just one example of a parameter. Another parameter may include travel time. That is, the smart alert server 150 may translate travel time into a location radius based on the relative speeds of the mobile element 105 and the mobile communication devices 101A, 101B, 101C and 101D. Thus, the smart alert server 150 may also determine to alert mobile communication devices 101A, 101B, 101C and 101D that are approaching an area that is within the predefined proximity of the location of the mobile element 105 at a speed that is within a predefined range with respect to a speed of the mobile element 105 such that the mobile communication devices 101A, 101B, 101C and 101D are within a particular travel time away from the approaching mobile element 105. In the case of an emergency vehicle, for example, mobile communication devices 101A, 101B, 101C and 101D that are within a three minute travel time away from the location of the mobile element 105 may be provided with alerts.

Parameter settings may also be set based on the environment. For example, in the case of an emergency vehicle traveling on a divided highway, parameter settings may be set to indicate that only mobile communication devices 101A, 101B, 101C and 101D travelling in the same direction as the emergency vehicle should be provided with alerts. This is described in more detail with reference to FIGS. 4A and 4B.

Based on the parameter settings for any particular alert, the smart alert server 150 determines which mobile communication devices 101A, 101B, 101C and 101D should be alerted, and passes this information back to the mobile switch 115. The mobile switch 115, in turn, provides the alerts to the mobile communication devices 101A, 101B, 101C and 101D that the smart alert server 150 determines should be alerted.

Referring again to FIG. 1A, assume that the smart alert server 150 determines which mobile communication devices 101A, 101B, 101C and 101D to alert based on which mobile communication devices 101A, 101B, 101C and 101D are within a predefined proximity of a location of the mobile element 105. This predefined proximity is illustrated as an area 125, which may be referred to as an alert zone. Mobile communication devices 101B and 101C are located within the alert zone 125. Thus, the smart alert server 150 would determine that mobile communication devices 101B and 101C should be provided with alerts and would send alerts to these devices via the mobile switch 115. Though mobile communication device 101D is within the vicinity of the mobile element 105, the mobile communication device 101D is not located within the alert zone 125. Thus, no alert would be provided to the mobile communication device 101D. Mobile communication device 101A is not even in the vicinity of the mobile element 105. Thus, not only would an alert not be provided to the mobile communication device 101A, but the location of the mobile communication device 101A would not be tracked by the smart alert server 150.

Figure 1B:
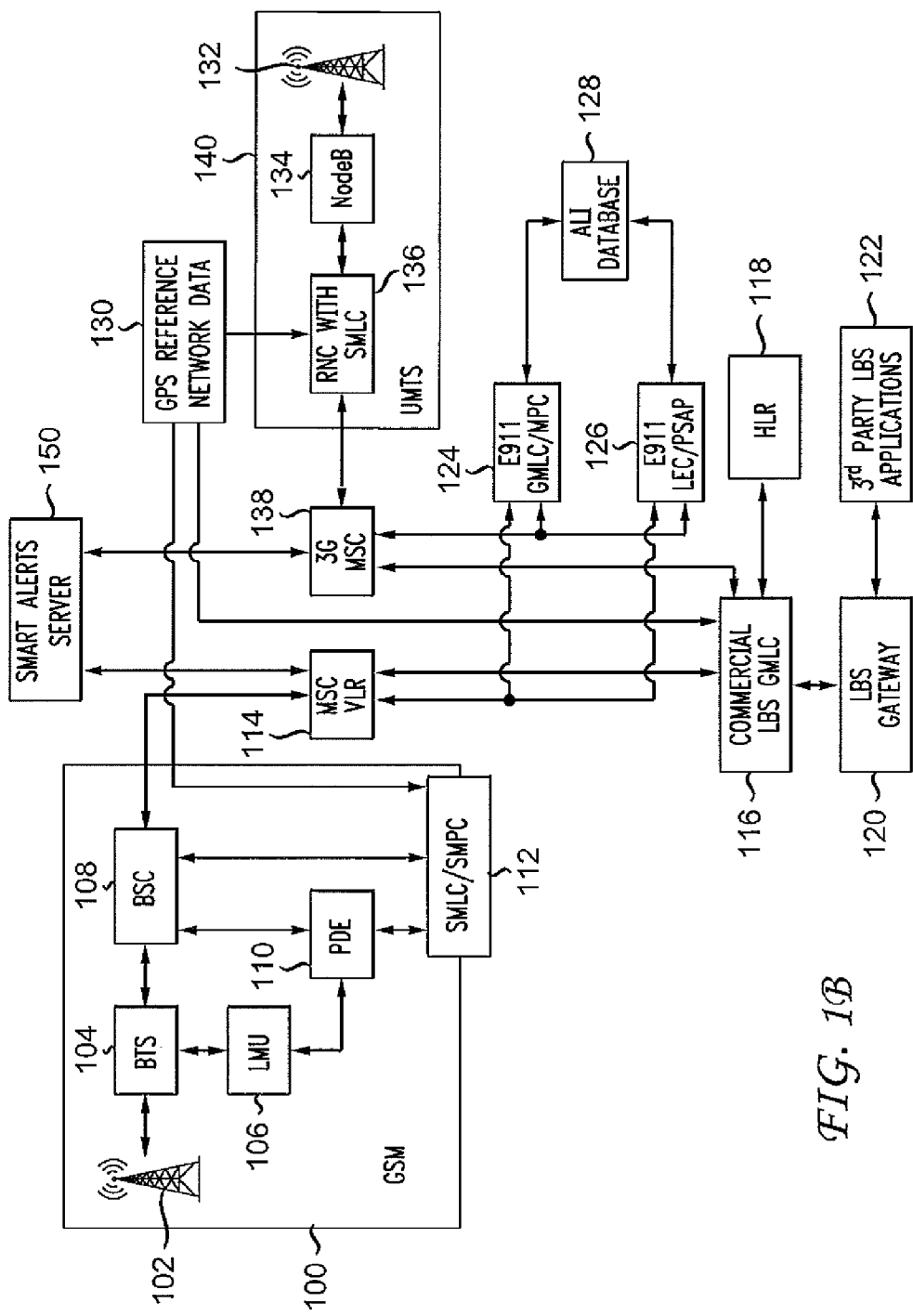
FIG. 1B illustrates, in detail, a cellular network environment in which illustrative embodiments may be implemented.

According to an illustrative embodiment, the smart alert server 150 may be included within the same cellular network as the mobile switch 115, as shown in FIG. 1B. As an alternative, the smart alert server 150 may be provided as a third party device which is in communication with cellular network including the mobile switch 115 via, e.g., the Internet. In either case, the alerts are provided to the mobile communication devices 101A, 101B, 101C and 101D via the cellular network.

The embodiments described herein may be implemented in wireless networks that use illustrative telecommunications standards, such as Global System for Mobile communications (GSM) and Universal Mobile Telecommunications Systems (UMTS) as illustrated in FIG. 1B. It should be understood, however, that the embodiments may be implemented in wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

FIG. 1B illustrates details of a wireless communications network in which a system for providing alerts to mobile communication devices may be implemented according to an illustrative embodiment. The network shown in FIG. 1B includes two radio access networks (RAN). A first RAN 100, illustrated in the upper left hand portion of FIG. 1B, is dedicated to GSM-based network access. A second RAN 140, illustrated in the upper right hand portion of FIG. 1B, is dedicated to UMTS-based network access. The subject disclosure is not limited to the illustrated embodiments for GSM and UMTS network access. Other access technologies are contemplated, such as LTE, as described above. The first RAN 100 is described immediately below.

The first RAN 100 includes one or more base transceiver stations (BTS) 104 for communicating with mobile communication devices. Although not shown for simplicity of illustration, it will be appreciated that the mobile communication devices may include, for example, mobile phones, portable computers with integrated, external, removable network access cards, etc. The BTS 104 is the terminating node for the radio interface in the first RAN. The BTS 104 can include one or more transceivers 102 and can be responsible for ciphering of the radio interface.

The BTS 104 is in communication with a base station controller (BSC) 108. The BSC 108 is configured to allocate radio resources to the mobile communication devices in communication with the BTS 104, administer frequencies, and control handovers between BTS's. Although illustrated as a distinct element, the BSC 108 functions can be incorporated in the BTS 104.

The BTS 104 is also in communication with a Location Measurement Unit (LMU) 106, which is, in turn, in communication with a Location/Positioning Determination Entity (PDE) 110. The PDE 110 calculates the location of mobile communication devices using measurements taken by the mobile communication device and/or the LMU 106. The BSC 108 is also in communication with the PDE 110 and a Serving Mobile Location Center (SMLC)/Serving Mobile Locationing/Positioning Center (SMPC) 112. The SMLC/SMPC 112 determines the locations of the mobile communication devices based on data from the PDE 110 and data from a location-determining system, e.g., GPS system 130. Although the description below is directed to a GPS system, it should be appreciated that any type of location-determining system may be used. The GPS system 130 may include GPS transceivers that are in communication with the mobile communication devices for obtaining information indicating the locations of the mobile communication devices. The SMLC/SMPC 112 provides location information back to the BSC 108, and the BSC 108 provides the location information to a Mobile Switching Center (MSC) 114.

The MSC 114 is configured to function as a mobile telecommunications switch. When the MSC 114 receives a communication from the BSC 108 and recognizes the communication as an emergency or location-based communication from a mobile communication device, the MSC 114 retrieves location information for the mobile communication device from the BSC 108.

The MSC 114 is also in communication with location databases, such a visiting location register (VLR) that may be colocated with the MSC 114, and a home location register (HLR) 118. The VLR can be logically associated with the MSC 114 as illustrated or can be a separate network element. The VLR is a database configured to store all subscriber data that is required for call processing and mobility management for mobile subscribers that are currently located in an area controlled by the VLR.

The HLR 118 is a database configured to provide routing information for mobile terminated (MT) calls and various messaging communications. The HLR 118 is also configured to maintain subscriber data that is distributed to the relevant VLR through the attach process and mobility management procedures, such as location area and routing area updates.

For providing location-based services, the HLR 118 is in communication with the MSC 114 and the VLR via a Commercial Location-Based Service (LBS)/Gateway Mobile Location Center (GMLC) 116. The Commercial LBS GMLC 116 communicates with the HLR 118 to acquire user information. The Commercial LBS GMLC 116 also communicates with and one or more third party LBS applications 122 via a LBS Gateway 120 to provide location-based services to mobile communication devices communicating with the network, such as navigational services, fleet tracking, etc.

For providing emergency services to the mobile communication devices, the MSC 114 is in communication with an E911 GMLC/Mobile Locationing/Positioning Center (MPC) 124 and an E911 Local Exchange Carrier (LEC)/PSAP 126. The E911 GMLS/MPC 124 and the E911 LEC/PSAP 126 communicate with an ALI database (ALI DB) 128 containing information representing a caller's location. The E911 GMLC/MPC 124 and the E911 LEC/PSAP 126 match a number of an inbound call, e.g., an inbound telephone number or ANI information, to a corresponding location of the caller stored in the ALI DB 128 and then deliver both the number and the location to the appropriate emergency service, e.g., fire, police, and or ambulance, for dispatch.

The second RAN 140, illustrated in the upper right hand portion of FIG. 1, is dedicated to UMTS-based network access and is now described. Mobile communication devices, such as mobile phones and portable computers, may communicate with the RAN 140 via one or more Node Bs 134. The Node B 134 is the terminating node for the radio interface in the second RAN 140. Each Node B 134 can include one or more transceivers 132 for transmission and reception of data to and from the mobile communication devices across the radio interface. Each Node B 134 is configured to apply codes to describe channels in a CDMA-based UMTS network. Generally, the Node B 134 performs similar functions for the UMTS network that the BTS 104 performs for the GSM network.

The Node B 134 is in communication with a radio network controller (RNC) 136. The RNC 136 is configured to allocate radio resources to the mobile communication devices, administer frequencies, and control handovers between Node B's 134. Generally, the RNC 136 performs similar functions for the UMTS network as the BSC 108 performs for the GSM network.

As shown in FIG. 1B, the RNC 136 includes an SMLC for determining a location of the mobile communication device based on data from the GPS system 130. As an alternative, the SMLC may be included as a distinct element. The RNC 136 is in communication with a 3G MSC 138, which performs similar functions as the MSC 114. Upon receipt of an emergency or location-based services call from a mobile communication device, the 3G MSC 138 communicates with the RNC 136 to obtain information regarding the location of the mobile communication device.

The 3G MSC 138 is also in communication with the Commercial LBS GMLC 116, the E911 GMLS/MPC 124, and the E911 LEC/PSAP 126, which perform the same functions for the UMTS network as described above for the GSM network.

According to an illustrative embodiment, the smart alert server 150 is in communication with the MSCs 114 and 138 to receive location information for the mobile element 105 and the mobile communication devices 101A, 101B, 101C and 101D being tracked and to provide alerts to those mobile communication devices 101A, 101B, 101C and 101D which the smart alert server 150 determines should be alerted. As noted above, the smart alert server 150 may be part of the cellular network shown in FIG. 1B or may be implemented with a third party device in communication with the cellular network.

Figure 2:
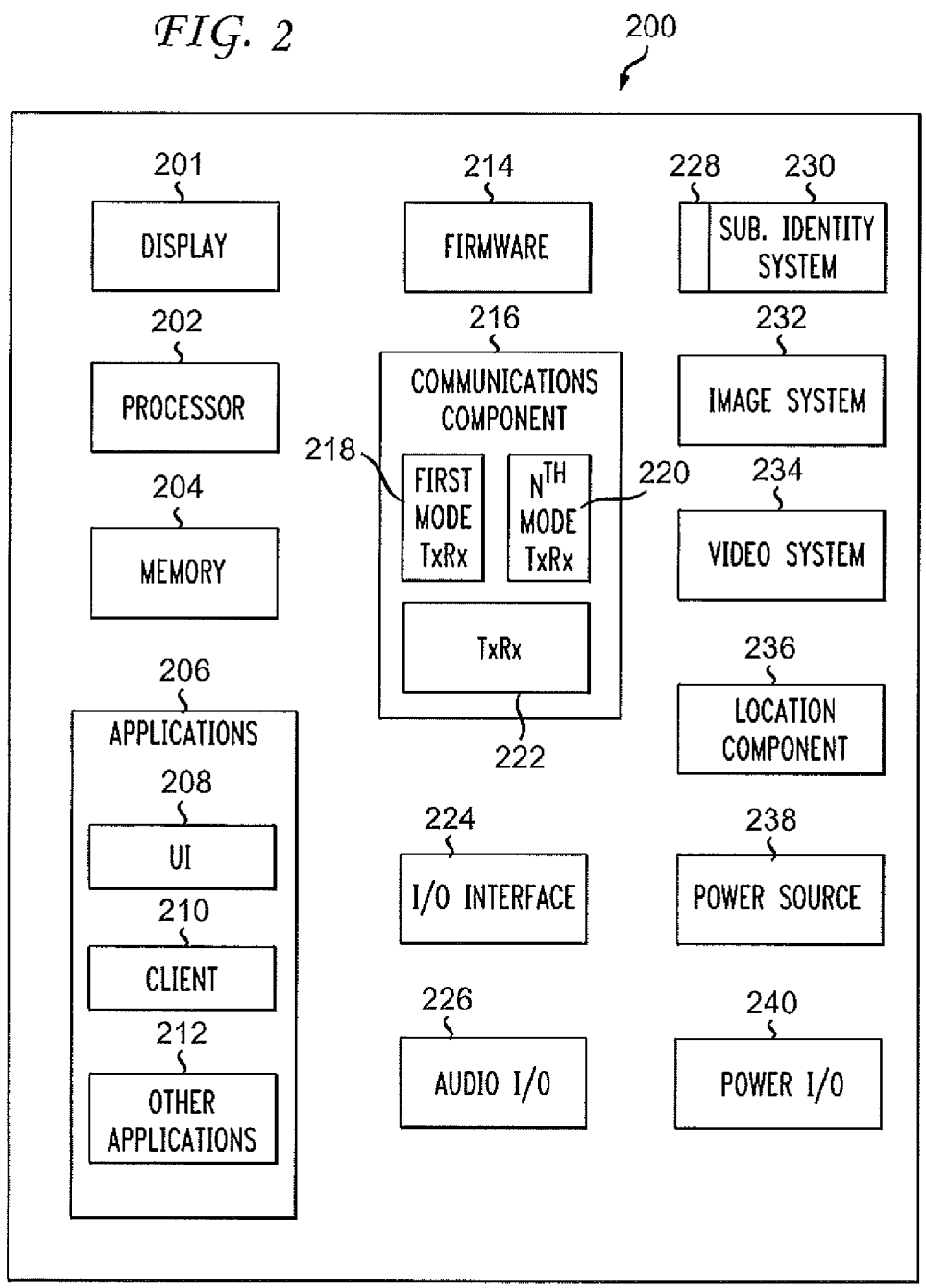
FIG. 2 illustrates a mobile communication device for receiving an alert according to an illustrative embodiment.

FIG. 2 illustrates a schematic block diagram of an illustrative device 200 with which the mobile communication devices 101A, 101B, 101C, and 101D may be implemented, according to an illustrative embodiment. It should be appreciated that, in the case of a mobile element 105 being an emergency vehicle, the source device within the emergency vehicle may be implemented with a device similar to that shown in FIG. 2. Alternatively, the source device may be implemented with any communication device capable of providing location information of a mobile element 105. Although no connections are shown between the components illustrated in FIG. 2, those skilled in the art will appreciate that the components can interact with each other via any suitable connections to carry out device functions.

Referring to FIG. 2, the device 200 may be a multimode handset and can include a variety of computer-readable media, including volatile media, non-volatile media, removable media, and non-removable media. The term "computer-readable media" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the device 200.

The device 200 may include a display 201 for displaying multimedia, such as, for example, text, images, video, and telephone functions, such as Caller ID data, setup functions, menus, music metadata, messages, wallpaper, graphics, Internet content, device status, preference settings, and the like. The display 201 may also provide alerts from the smart alert server 150 in a visual manner to warn the user of the device 200 of an approaching emergency. The alert may be in the form of, for example, a flashing light or a visual message, e.g., "Emergency vehicle approaching. Move over".

The device 200 may include a processor 202 for controlling and/or processing data. A memory 204 can interface with the processor 202 for the storage of data and/or applications 206. The applications 206 may include, for example, SMS messaging software, EMS message software, MMS messaging software, USSD software, a WAP browser, and the like.

The applications 206 may also include a user interface (UI) application 208. The UI application 208 can interact with a client 210 (e.g., an operating system) to facilitate user interaction with device functionality and data, for example, viewing received messages, answering/initiating calls, entering/deleting data, password entry and settings, configuring settings, address book manipulation, and the like. Such user interaction may be facilitated via, e.g., a keypad or a touchscreen included in the device 200 or communicating with the device via the I/O interface 224. Also, according to an illustrative embodiment, using the UI 208, a user may indicate how he or she would like to be alerted of an approaching emergency. That is, the user may indicate that an audible alert is preferable to a visual alert or that an alert that is both audible and visual is preferable. Alternatively, the smart alert server may dictate in what form alerts should be provided to the user.

The applications 206 may include other applications 212, such as, for example, add-ons, plug-ins, email applications, music application, video applications, camera applications, location-based service (LSB) applications, power conservation applications, game applications, productivity applications, entertainment applications, combinations thereof, and the like, as well as subsystem and/or components.

The applications 206 can be stored in the memory and/or in firmware components 214 and can be executed by the processor 202. The firmware 214 can also store code for execution during initialization of the device 200.

A communications component 216 may interface with the processor 202 to facilitate wired/wireless communication with external systems including, for example, cellular networks, location systems, VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks; Internet based radio service networks, combinations thereof, and the like. The communications component 216 can process data from a cellular network, a corporate network, a home broadband network, a WIFI hotspot, and the like via an ISP, DSL provider, or broadband provider. The communications component 216 can be used to receive alerts from the smart alert server 150 via the mobile switch 115 and the base station with which the device is registered.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device 200 and a network or local device instead of, or in addition to, the communications component 216.

Audio capabilities may be provided by an audio I/O component 226 that may include a speaker for the output of audio signals and a microphone to collect audio signals. Alerts from the smart alerts server 150 may be provided in an audible manner via the speaker. For example, the speaker may provide a tone and/or a message, e.g., "Emergency vehicle approaching. Move over". The audible alert may be provided in conjunction with or separately from the visual alert.

Although not illustrated, tactile alerts may also be provided, e.g., the device 200 may vibrate to alert a user of the device. Also, the alert may be provided in a graduated form such that the alert becomes more evident as the mobile element approaches. For example, the audible message may become louder, the visual alert may become brighter, and/or the tactile alert may become stronger as an emergency vehicle gets closer to a vehicle including the device 200.

The device 200 can include a slot interface 228 for accommodating a subscriber identity system 230 such as, for example, a subscriber identity module (SIM) or universal SIM (USIM). The subscriber identity system 230 instead can be manufactured into the device 200, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 200 can further include an image capture and processing system 232 (image system). Photos and/or videos can be obtained via an associated image capture subsystem of the image system 232, for example, a camera. The device 200 may also include a video system 234 for capturing, processing, recording, modifying, and or transmitting video content.

A location component 236 may be included to send and/or receive signals such as, for example, GPS data, A-GPS data, WIF/WIMAX and or cellular network triangulation data, combinations thereof; and the like. The location component 236 can interface with cellular network nodes, telephone lines, satellites (such as satellites 135A and 135B), location transmitters and/or beacons, wireless network transmitters and receivers, for example, WIFI hotspots, radio transmitters, combinations thereof and the like. The device 200 may obtain, generate, and/or receive data to identify its location or can transmit data used by other devices, to determine the device location. The location of the device 200 can be stored locally in the device 200 and provided to the smart alert server 150 upon request.

The device 200 may also include a power source 238, such as batteries and/or other power subsystems (AC or DC). The power source 238 can interface with an illustrative power system or charging equipment via a power I/O component 240.

Figure 3:
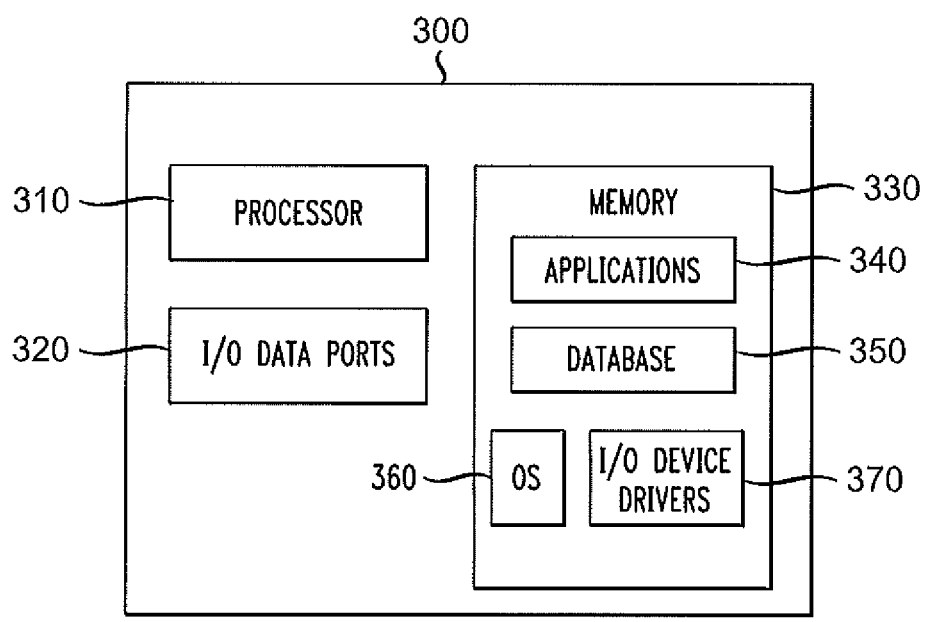
FIG. 3 illustrates a device for providing an alert according to an illustrative embodiment.

FIG. 3 is a block diagram of a device 300 with which the smart alert server 150 may be implemented according to an illustrative embodiment. The device 300 includes a processor 310 that receives information, such as information indicating the locations of a mobile element 105 and the location(s) of mobile communication device(s) 101A, 101B, 101C and 101D within a vicinity of the mobile element 105. In one embodiment, the processor 310 may also receive information indicating the speed and direction of travel of the mobile element 105 and information indicating the speed(s) and direction(s) of travel of the mobile communication device(s) 101A, 101B, 101C and 101D within the vicinity of the mobile element 105. This information is received via I/O Data Ports 320. The I/O Data Ports 320 can be implemented with, e.g., an interface including an antenna or other suitable type of transceiver through which data and signals may be transmitted and received. It should be appreciated that the I/O Data Ports 320 can be used for communications between with the mobile switch 115.

The processor 310 communicates with a memory 330 via, e.g., an address/data bus (not shown). The processor 310 can be any commercially available or customer processor. The memory 330 is representative of the overall hierarchy of memory devices containing the software and data used to implement the functionality of the device 300. The memory 330 can include, but is not limited to, the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like.

As shown in FIG. 3, the memory 330 may include several categories of software and data used in the device 300, including, applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 can be stored in the memory 330 and/or in a firmware (not shown) as executable instructions, and can be executed by the processor 310. The applications 340 include various programs that, when executed by the processor 310, implement the various features of the device 300, including applications for determining the speed(s) and direction(s) of travel of the mobile element 105 and the mobile communication devices 101A, 101B, 101C and 101D within the vicinity of the mobile element 105, applications for determining relative location (s) of the mobile element 105 with respect to the mobile communication devices 101A, 101B, 101C and 101D, and applications for determining what mobile communication devices 101A, 101B, 101C and 101D to provide alerts to, based on specified parameters. The applications 340 may be applied to data stored in the database 350, such as the specified parameters, along with data, e.g., received via the I/O data ports 320, such as the location/speed/direction of travel information. The database 350 represents the static and dynamic data used by the applications 340, the OS 360, the I/O device drivers 370 and other software programs that may reside in the memory 330.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

It should be understood that FIG. 3 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or in stead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Figure 4A:
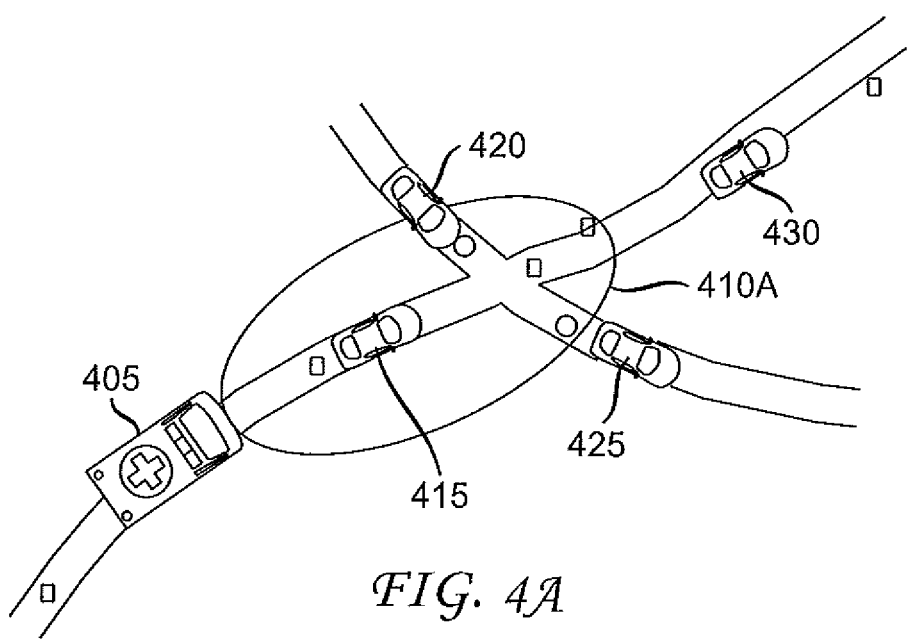
FIGS. 4A and 4B illustrate examples of scenarios in which mobile communication devices within vehicles may be alerted of the approach of an emergency vehicle, according to illustrative embodiments.
Figure 4B:
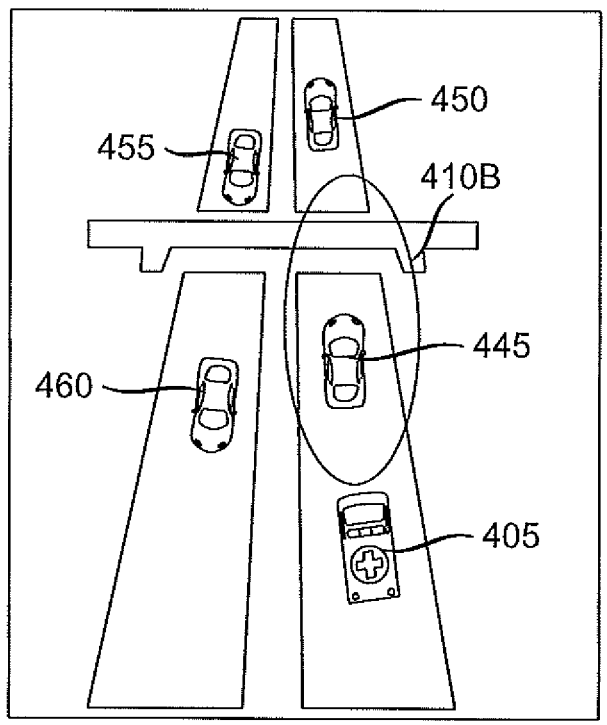

FIGS. 4A and 4B illustrate examples of how alerts may be provided in various scenarios according to illustrative embodiments. Referring to FIG. 4A, an alert zone 410A may be a predefined area within a predetermined proximity of a moving emergency vehicle 405. As the emergency vehicle 405 moves, so does the predefined alert zone 410A. In this scenario, a vehicle 415 is in the path of the emergency vehicle 405 and within the alert zone 410A, and a vehicle 420 is approaching the alert zone 410A. Accordingly, mobile communication devices within the vehicles 415 and 420 would be sent alerts by the smart alert server 150. Vehicle 425 is just outside of the alert zone and moving away from the zone 410A. Thus, a mobile communication device within the vehicle 425 would not be provided with an alert. Also, the mobile communication device within the vehicle 430, which is not located within the alert zone 410A, and is moving away from the alert zone, would not be provided with an alert.

FIG. 4B illustrates a scenario in which an emergency vehicle is approaching vehicles on a divided highway. In this scenario, the alert zone 410B may be predefined such that it does not extend outside of the highway on which the emergency vehicle is traveling or behind the emergency vehicle but does extend a predetermined distance in the direction of travel of the emergency vehicle 405. As explained above, the predetermined alert zone is a parameter setting which may be stored in the smart alert server 150 and/or provided by the source device. It should be appreciated that the alert zone may be any shape, which may be determined, e.g., by the source device or the smart alert server 150, based on the type of emergency and/or the environment.

Referring again to FIG. 4B, vehicle 445 is in the path of the emergency vehicle 405 and within the alert zone 410B. Thus, the mobile communication device in the vehicle 445 would be alerted. Vehicles 450, 455, and 460 are not located within the alert zone 410B and would not be alerted.

Although not described above, according to additional embodiments, a mobile communication device within an emergency vehicle may be equipped to transmit signal to a traffic light controller to dynamically control traffic lights on a predefined route to allow the emergency vehicle to travel safely through intersections. The mobile communication device may also send a signal to the mobile communication devices which are on a predetermined route of the emergency vehicle (e.g., the route to a specific hospital) within a certain area to alert those vehicles to detour from the route. The mobile communication device may also cause the mobile communication devices within surrounding vehicles to be alerted as to the proper course of action to take to allow the emergency vehicle the most expeditious path. For instance, in a divided highway scenario, the mobile communication devices within the surrounding vehicles may be sent an alert to move to the right by a coordinated message which would allow the left lane to free up and be accessed by the emergency vehicle.

According to further embodiments, in addition to providing emergency alerts, the smart alert server 150 may provide information which may otherwise be relevant to users of mobile communication devices 101A, 101B, 101C and 101D within a predefined proximity to a mobile element 105, such as a moving point of sale. Such information may include advertisements, coupons, etc.

Figure 5:
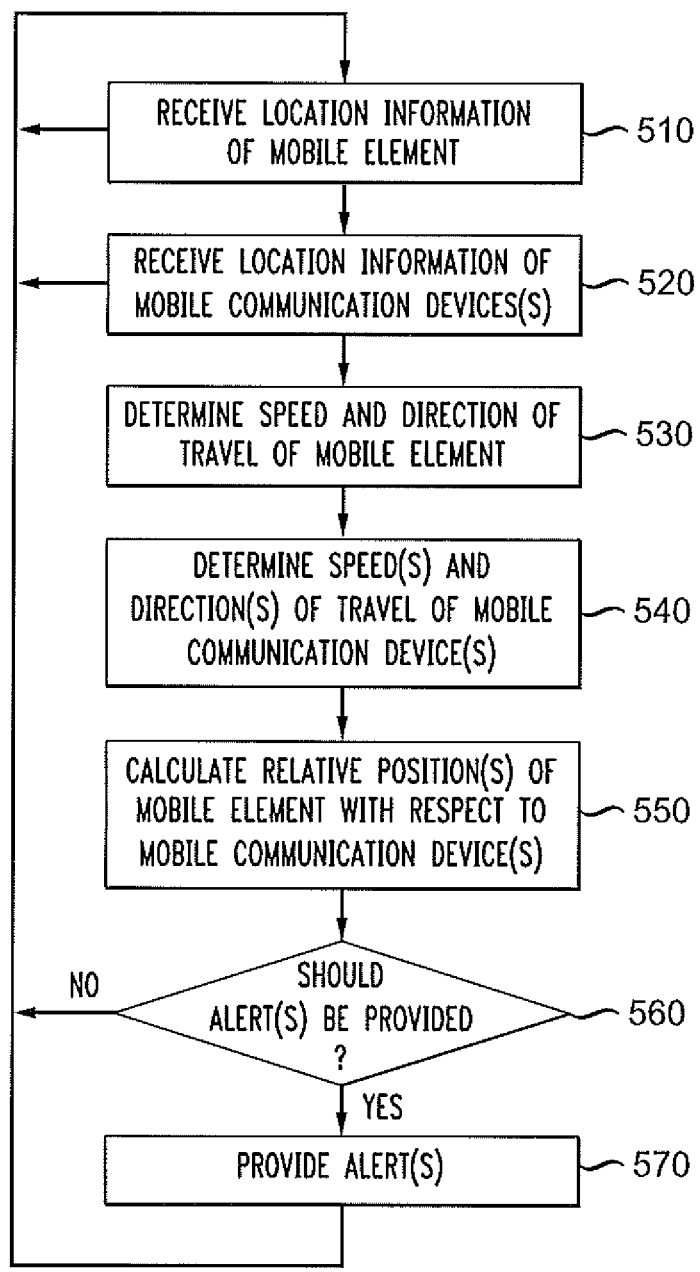
FIG. 5 illustrates a method for providing an alert according to an illustrative embodiment.

FIG. 5 illustrates a method for providing an alert to a mobile communication device according to an illustrative embodiment. Referring to FIG. 5, information indicating a location of a mobile element 105, e.g., an emergency vehicle, is received by the smart alert server 150 at step 510. This information may be received from a source device associated with the mobile element 105, such as a mobile communication device included within the emergency vehicle. At step 520, information indicating location(s) of mobile communication device(s) that are located within a vicinity of the mobile element 105, e.g., mobile communication devices 101B, 101C, and 101D is received by the smart alert server 150. It should be appreciated that the location information of the mobile element 105 and the mobile communication device(s) 101B, 101C and 101D may be received at any time and in any order. For example, the location information of the mobile element 105 and the mobile communication devices 101B, 101C and 101D may be continually received by the smart alert server 150. Alternatively, the location information of the mobile element 105 and the mobile communication devices may be received upon request by the smart alert server 150. As yet another alternative, the location tracking information of the mobile element 105 may be provided to the smart alert server 150 by the source device, responsive to the source device detecting that the mobile element 105 needs to be tracked, e.g., responsive to an emergency vehicle turning on its sirens and emergency lights. Then, the smart alert server 150 may request the location information of the mobile communication devices 101B, 101C and 101D within the vicinity of the mobile element 105. The smart alert server 150 may cease to request/receive tracking information once there is an indication that the emergency event has ended, e.g., when the emergency vehicle turns its sirens and lights off.

At step 530, the speed and direction of travel of the mobile element 105 are determined by the smart alert server 150. In the case of the mobile element 105 being an emergency vehicle or some other element including a source device, such as mobile communication device, the smart alert server 150 may calculate the speed and direction of travel of the mobile element 105 based on the location of the mobile element 105 over a predetermined time period, e.g., a number of seconds. Alternatively, if the source device associated with the mobile element 105 includes sufficient tracking capabilities, the speed and direction of travel of the mobile element 105 may be calculated by the source device and transmitted to the smart alert server 150. In the case of a weather event, the speed and direction of travel may, alternatively, be calculated by a weather tracker source device and transmitted to/received by the smart alert server 150.

At step 540, the speed and direction of travel of the mobile communication device(s) 101B, 101C and 101D are determined, based on the location(s) of the mobile communication device(s) 101B, 101C and 101D over the predetermined time period. The smart alert server 150 may calculate the speed and direction of travel for the mobile communication device(s) 101B, 101C and 101D based on the location(s) of the mobile communication devices 101B, 101C and 101D over a predetermined time period, e.g., a number of seconds. Alternatively, if the mobile communication device(s) 101B, 101C and 101D include sufficient tracking capabilities, the speed and direction of travel of the mobile communication device(s) 101B, 101C and 101D may calculated by the mobile communication device(s) 101B, 101C and 101D and transmitted to the smart alert server 150. At step 560, the smart alert server 150 calculates a relative location of the mobile communication device(s) 101B, 101C and 101D with respect to the mobile element 105 based on the received location information from the mobile element 105 and the mobile communication device(s) 101B, 101C and 101D over the predetermined time period, the speed and direction of travel of the mobile element 105, and the speed and direction of travel of the mobile communication device(s) 101B, 101C and 101D. At step 570, the smart alert server 150 determines, based on the relative location(s) of the mobile communication device(s) 101B, 101C and 101D with respect to the mobile element 105 and a predetermined parameter, whether an alert associated with the mobile element 105 should be provided to the mobile communication device(s) 101B, 101C and 101D. The smart alert server 150 may determine, for example, that the alert should be provided to mobile communication devices 101B and 101C which are located within an alert zone 125.

If it is determined that the alert should be provided, the alert is provided at step 570. If is determined that the alert should not be provided, the process returns to step 510, and tracking of the locations of the mobile element 105 and the mobile communication devices continues 101B, 101C and 101D.

As indicated in FIG. 5, steps 510 and 520 may be continually repeated, and the relative location(s) may be continually calculated as the locations, speeds, and/or direction of travel of the mobile element 105 and/or the mobile communication devices 101B, 101C and 101D change. Thus, the smart alert server 150 continually receives changes to the locations(s) of the mobile element 105 and the mobile communication devices 101B, 101C and 101D.

It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, sonic or all steps of the method, and/or substantially equivalent steps can be performed by execution of computer-executable instructions stored or included on a non-transitory computer-readable medium.

The law does not require and it is economically prohibitive to illustrate and teach every possible embodiment of the present claims. Hence, the above-described embodiments are merely illustrations of implementations set forth for a clear understanding of the claimed subject matter. Variations, modifications, and combinations may be made to the above-described embodiments without departing from the scope of the claims. All such variations, modifications, and combinations are included herein by the scope of this disclosure and the following claims.

What is claimed is:

1. A method comprising:

receiving, at a server comprising a processor, first information indicating a location of a mobile element, wherein the first information includes changes to the location of the mobile element over a predetermined time period;

in response to receiving the first information indicating the location of the mobile element, requesting, from a mobile switch, second information indicating a respective location of each mobile communication device that is connected to, camped on, or registered to a base station to which the mobile element is registered;

receiving, at the processor, the second information indicating the respective location of a mobile communication device that is connected to, camped on, or registered to the base station to which the mobile element is registered, wherein the second information includes changes to the respective location of the mobile communication device over the predetermined time period, wherein the mobile switch is remote from the server and the mobile element is distinct from the mobile communication device;

determining, by the processor, a speed and a direction of travel of the mobile element;

determining, by the processor, a speed and a direction of travel of the mobile communication device based on the second information;

calculating, by the processor, a relative location of the mobile communication device with respect to the mobile element based on the first information, the second information, the speed and the direction of the travel of the mobile element, and the speed and the direction of travel of the mobile communication device; and determining, by the processor, based on the relative location of the mobile communication device with respect to the mobile element, whether an alert associated with the mobile element should be provided to the mobile communication device.

2. The method of claim 1, wherein determining the speed and the direction of travel of the mobile element includes calculating the speed and the direction of travel of the mobile element based on the first information.

3. The method of claim 1, wherein determining the speed and the direction of travel of the mobile element includes receiving information indicating the speed and the direction of travel of the mobile element.

4. The method of claim 1, wherein determining the speed and the direction of travel of the mobile communication device includes calculating the speed and the direction of travel of the mobile communication device based on the second information.

5. The method of claim 1, wherein determining the speed and the direction of travel of the mobile communication device includes receiving information indicating the speed and the direction of travel of the mobile communication device.

6. The method of claim 1, wherein the mobile element is an emergency vehicle.

7. The method of claim 1, wherein the mobile element is a moving environmental element.

8. The method of claim 1, wherein determining whether the alert should be provided to the mobile communication device further comprises determining whether the respective location of the mobile communication device is within a predefined proximity of the location of the mobile element.

9. The method of claim 8, wherein determining whether the alert should be provided to the mobile communication device further comprises determining whether the speed at which the mobile communication device is approaching an area that is within the predefined proximity of the location of the mobile element is within a predefined range with respect to the speed of the mobile element.

10. The method of claim 1, wherein determining whether to provide the alert to the mobile communication device further comprises determining whether the direction of travel of the mobile communication device is within a path of travel of the mobile element.

11. The method of claim 1, further comprising, responsive to determining that the alert should be provided to the mobile communication device, initiating transmission of the alert to the mobile communication device over a cellular network.

12. A server comprising:
a processor; and
a memory that stores instructions which, when executed by the processor, cause the processor to perform operations comprising:
receiving first information indicating a location of a mobile element, wherein the first information includes changes to the location of the mobile element over a predetermined time period,
in response to receiving the first information indicating the location of the mobile element, requesting, from a mobile switch, second information indicating a respective location of each mobile communication device that is connected to, camped on, or registered to a base station to which the mobile element is registered,
receiving the second information indicating the respective location of a mobile communication device that is connected to, camped on, or registered to the base station to which the mobile element is registered, wherein the second information includes changes to the respective location of the mobile communication device over the predetermined time period,
determining a speed and a direction of travel of the mobile element,
determining a speed and a direction of travel of the mobile communication device based on the second information,
calculating a relative location of the mobile communication device with respect to the mobile element based on the first information, the second information, the speed and the direction of the travel of the mobile element, and the speed and the direction of travel of the mobile communication device, and
determining, based on the relative location of the mobile communication device with respect to the mobile element, whether an alert associated with the mobile element should be provided to the mobile communication device.

13. The server of claim 12, wherein determining whether the alert should be provided to the mobile communication device further comprises determining whether the respective location of the mobile communication device is within a predefined proximity of the location of the mobile element.

14. The server of claim 13, wherein determining whether the alert should be provided to the mobile communication device further comprises determining whether the speed at which the mobile communication device is approaching an area that is within the predefined proximity of the location of the mobile element is within a predefined range with respect to the speed of the mobile element.

15. The server of claim 12, wherein determining whether to provide the alert to the mobile communication device further comprises determining whether the direction of travel of the mobile communication device is within a path of travel of the mobile element.

16. The server of claim 12, wherein the operations further comprise initiating transmission of the alert to the mobile communication device over a cellular network.

17. A non-transitory computer-readable storage device storing instructions which, when executed by a processor of a server, cause the processor to perform operations comprising:
receiving first information indicating a location of a mobile element, wherein the first information includes changes to the location of the mobile element over a predetermined time period;
in response to receiving the first information indicating the location of the mobile element, requesting, from a mobile switch, second information indicating a respective location of each mobile communication device that is connected to, camped on, or registered to a base station to which the mobile element is registered;
receiving the second information indicating the respective location of a mobile communication device that is connected to, camped on, or registered to the base station to which the mobile element is registered, wherein the second information includes changes to the respective location of the mobile communication device over the predetermined time period, wherein the mobile switch is remote from the server and the mobile element is distinct from the mobile communication device;

determining a speed and a direction of travel of the mobile element;

calculating a speed and a direction of travel of the mobile communication device based on the second information;

calculating a relative location of the mobile communication device with respect to the mobile element based on the first information, the second information, the speed and the direction of travel of the mobile element, and the speed and the direction of travel of the mobile communication device; and determining, based on the relative location of the mobile communication device with respect to the mobile element, whether an alert associated with the mobile element should be provided to the mobile communication device.

18. The non-transitory computer-readable storage device of claim 17, wherein determining whether the alert should be provided to the mobile communication device further comprises determining whether the respective location of the mobile communication device is within a predefined proximity of the location of the mobile element.

19. The non-transitory computer-readable storage device of claim 17, wherein determining whether to provide the alert to the mobile communication device further comprises determining whether the direction of travel of the mobile communication device is within a path of travel of the mobile element.

20. The non-transitory computer-readable storage device of claim 17, wherein the operations further comprise initiating transmission of the alert to the mobile communication device over a cellular network.

* * * * *